United States Patent [19]

Caywood et al.

[11] Patent Number: 4,536,989
[45] Date of Patent: Aug. 27, 1985

[54] CROSS ARM UNIT

[75] Inventors: Clayton D. Caywood, Lodi, Calif.; Ronald L. Bogh, McMinnville, Oreg.

[73] Assignee: Cascade Steel Rolling Mills, Inc., McMinnville, Oreg.

[21] Appl. No.: 604,238

[22] Filed: Apr. 26, 1984

[51] Int. Cl.³ .............................................. A01G 17/06
[52] U.S. Cl. .......................................................... 47/46
[58] Field of Search ................ 47/44, 47, 46; 256/11, 256/12, 47, 48

[56] References Cited

U.S. PATENT DOCUMENTS 3,731,429  5/1973  Orthman ................................. 47/47

FOREIGN PATENT DOCUMENTS 62667    6/1977  Australia ................................. 47/46
2475351  8/1981  France ................................... 47/46
73362    of 1916  Switzerland ........................... 47/47

*Primary Examiner*—Robert A. Hafer
*Assistant Examiner*—Danton D. DeMille
*Attorney, Agent, or Firm*—Klarquist, Sparkman, Campbell, Leigh & Whinston

[57] ABSTRACT

A cross arm unit for supporting wires such as in a grape-vine supporting trellis. The cross arm unit has an elongated arm member which is secured to a socket member transversely related to the arm member. The end portions of the arm member are reverse curled with the ends being spaced from the remainder of the arm member to provide wire-passing slots. In one form of the invention the socket member is of square cross section with the arm member bisecting the passageway of the socket member so as to form a stop facilitating frictional mounting of the cross arm unit of the top of a post. When the post is of standard metal construction, the socket member will be arranged so that the arm member crosses its passageway diagonally. When the cross arm unit is intended for mounting on a wooden stake, the socket member will be arranged so that the cross arm member is normal to one set of side faces of the socket member but parallel to the other set. If the cross arm unit is intended to be mounted not at the top but along the length of a post, the socket member can be disposed to one side of the cross arm member. If the arm is of substantial length, bridging elements may be employed. The invention also contemplates a trellis unit which comprises a cross arm unit as above described mounted on a metal stake of standard construction.

2 Claims, 6 Drawing Figures

U.S. Patent  Aug. 27, 1985  4,536,989
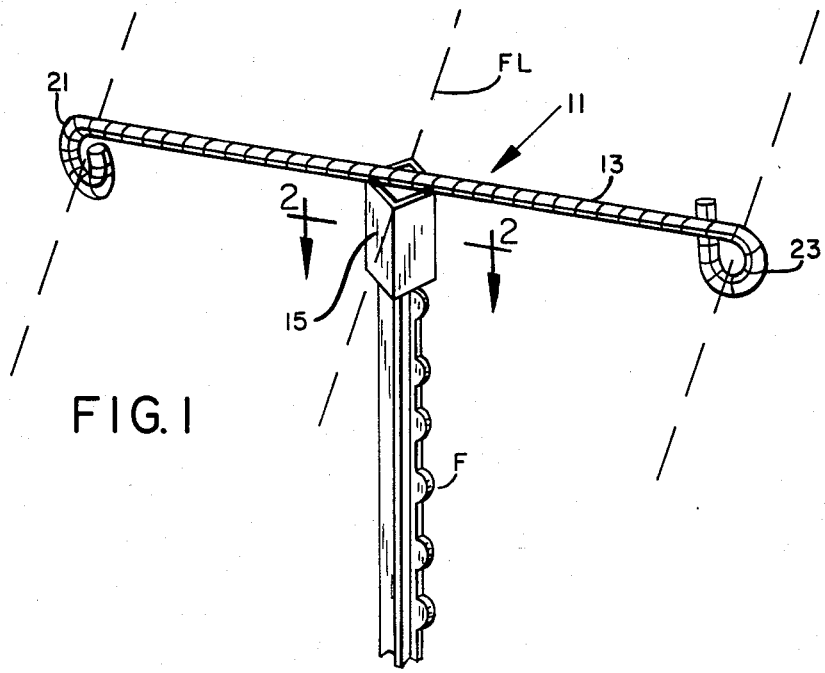
FIG. 1
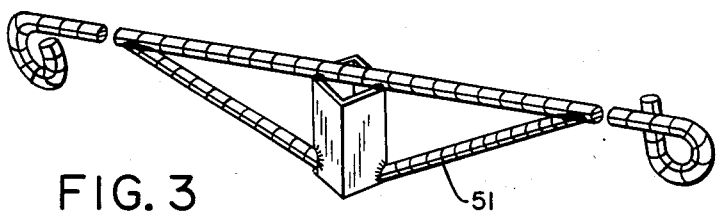
FIG. 3
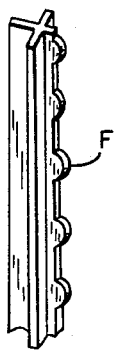
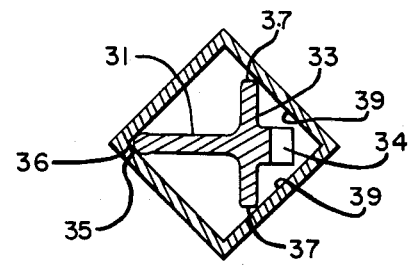
FIG. 2
FIG. 5
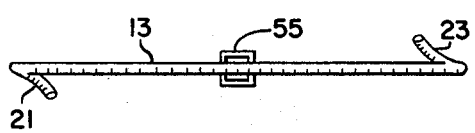
FIG. 4
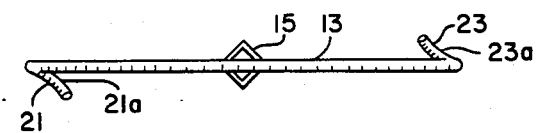
FIG. 6
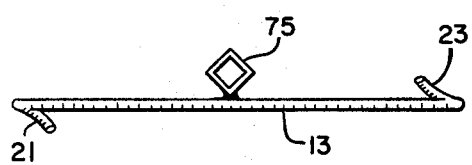

CROSS ARM UNIT

This invention relates to cross arm units and particularly those for use in supporting wires and the like.

It is common practice in vineyards to provide a grape vine-supporting trellis made up of a line of fence posts or stakes and associated cross arms, which support wires in parallel relation to the fence line. The cross arms are fastened to the stakes or posts by bolts and nuts or straps, and the wires are similarly fastened to the ends of the cross arms.

The above practice is expensive, not only from the standpoint of having to furnish separate fastening devices, but more particularly in the time it takes to mount a cross arm on a post and to apply the wires to the cross arm.

The present invention overcomes the above problems by providing a cross arm having a socket member which slidably fits down onto the upper end of a post. The ends of the arm member are curled back so as to provide a pair of eyes for receiving the wires, the ends being spaced from the main portion of the arm member to provide slots to facilitate ready mounting of wires onto a cross arm by passing them through the slots.

In one form of the invention, the cross arm is secured to the socket member so that the former crosses over the passageway of the latter, to serve as a stop for engagement with the upper end of the post.

In the form of the invention intended to be mounted on metal posts, the socket member is of square cross section and is secured to the arm member with the arm member located in diagonal relation to the socket member, so that when the cross arm unit is mounted on a standard metal fence post of a standard line of such posts, the cross arm will extend normal to the fence line so as to dispose the eyes in proper positions for supporting wires. The passageway or socket of the socket member is of such size that although the standard metal fence post is unsymmetrical in cross section, the socket member nevertheless can slidably fit on a post to provide a stable mount having a predetermined orientation of a cross arm unit to a post.

In the form of the invention in which the cross arm unit is to fit wood posts, the cross arm member is arranged parallel to one pair of sides of the socket member and normal to the other, because wooden posts or stakes of square cross section are normally driven into the soil with one set of sides faces parallel to the fence line.

Where the cross arm unit is intended for wooden stakes and where the cross arm unit is to be mounted on the upper end of the wooden stake or post, the cross arm will be arranged to bisect the socket member passageway.

In certain instances it may be desirable to locate the cross arm other than at the top of a post or stake. In such event, the socket can be mounted to one side of the cross arm.

In those instances in which the cross arm is of substantial length, bridging elements serving as gussets can be provided.

DRAWINGS

FIG. 1 is a perspective view of a cross arm unit of the present invention mounted on a standard metal fence post;

FIG. 2 is a cross sectional view on an enlarged scale, taken along line 2—2 of FIG. 1;

FIG. 3 is a view of a modified cross arm unit showing the same in the process of being mounted on a fence post;

FIG. 4 is a plan view of a cross arm unit of FIG. 1;

FIG. 5 is a plan view of another modified form of cross arm unit; and

FIG. 6 is a plan view of a further modified form of cross arm unit.

FIG. 1 shows a standard metal fence post F on which a cross arm unit generally indicated at 11 is mounted.

The cross arm unit includes an elongate arm member 13 secured to a socket member 15 in such fashion as to cross the passageway of the socket member, whereby to form a stop for engagement with the upper end of the post F to stably mount the cross arm unit on the post.

The arm member is arranged in diagonally bisecting relationship to the socket member to dispose the arm member 13 in normal relationship to the fence line FL of which the metal post F is a part.

At each end of the arm member 13 is an eye, one numbered 21 while the other is numbered 23. Each eye is formed by bending the end portion of the arm member in return curling fashion so as to provide an eye, with the end of each eye being disposed laterally to one side of the arm member 13, as is most clearly shown in FIG. 4. This arrangement provides a wire-passing slot for each eye, one slot being labeled 21a in FIG. 4 while the other eye is labeled 23a.

Referring to FIG. 2, it is pointed out that the standard metal fence post in cross section is of essentially T shape, having a shank portion 31 and a head portion 33. The shank portion is longer, considering the metal stake in cross section, than one-half the internal diagonal of the socket member. Each section of the head 33 is of lesser length (with the post being considered in cross section) than the shank 31. The standard metal fence post has a scalloped rib 34 which is for a purpose unimportant to the present invention.

We have discovered, that an effective frictional fit between a standard metal fence post and a socket member can be obtained if the socket member 15 is made of square cross section, with the end edge 35 of the shank 31 fitting in a corner 36 of the socket provided by the socket member, and with end edges 37 of the head 33 abutting against the inner faces 39 which are remote from the corner 36.

With the above relationship of the parts, the socket has a frictional fit with the fence post in such a fashion as to prevent any objectionable circumferential wobbling of the socket member on the post. Different size sockets would be provided for posts of different cross sectional sizes.

FIG. 3 shows a modified form of cross arm unit, which is identical to the unit in FIG. 1 except having bridging portions 51 extending between the socket and portions of the arm member 13 spaced from the socket. This construction is used when the cross arm is of substantial length relative to the cross sectional size of the cross arm member 13.

FIG. 3 also shows the relationship of the cross arm member relative to the post F just before the cross arm unit is applied to the upper end of the fence post F.

FIG. 5 shows a modified form of the invention in which the socket member 55 is intended for mounting onto a wooden post. Where wooden posts are used, it is common practice to mount them with one set of faces parallel to the fence line and the other set normal to the fence line. In such an arrangement, the cross arm member 13 will bisect the passageway of the square cross section socket member 55, in a direction normal to one set of faces of the socket member and parallel to the other set of side faces. The eyes 21 and 23 for the FIG. 5 construction will be identical to the eyes of FIG. 1.

In certain instances, it may be desired to locate a cross arm unit not at the top of the post but somewhere along the length of the post.

In such instance, FIG. 6 shows that the socket member 75 is mounted to one side of the cross arm 13 so that the upper end of the post can pass by the cross arm. Thus, in this form of the construction, the cross arm does not serve as a stop.

In FIG. 6 it is assumed that the cross arm unit is to be mounted on a metal post. If it were a wooden post, the member 75 would be turned 45 degrees so that, viewed in FIG. 6, the general orientation of the member 75 would be like that in FIG. 5, but of course with the arm member located one side of rather than in bisecting relation to the member 75. The eyes 21 and 23 of the FIG. 6 form of the invention are the same as those in FIG. 1.

The present invention is provided with not only a cross arm unit but also a trellis unit comprising a cross arm unit and a post, particularly a metal post, wherein the relationship of the parts will be as shown in FIG. 2.

We have discovered that the sturdy and very acceptable form of cross arm unit can be provided by forming the arm member from a section of rebar. The return bent portions can be readily provided by use of a stirrup bender, first on one end portion of a rebar and then on the opposite end portion, turning the section of rebar over when forming the second eye. This locates the eyes on opposite sides of the main portion of the arm member and provides wire-receiving slots that are at the top portions of the eyes and open upwardly. It is evident that the slots provided by the return bent portions are oriented transversely to the length of the trellis wires, thus requiring that portions of the wires at the eyes be flexed transversely in order to pass through the slots. This construction, plus the top-located, upwardly-opening eyes provides a very secure mounting arrangement for the eyes preventing their inadvertently being dislodged from the eyes, even though the wires are not affixed to the eyes.

It is further evident that by providing a slot for each eye, the wires instead of having to be threaded through the eyes, can be flexed and passed through the slots. This is particularly useful when replacing trellis arms because by not having to thread the wires through the eyes, the wires can be left intact and the cross arm unit applied to them and the associated post.

It is evident from the above description that the cross arm unit of the present invention is so constructed as to enable it to be simply frictionally fitted onto the upper portion of a post, where, in the FIGS. 1-5 forms of the invention, the arm member provides a stop which engages the upper end of the post to provide a stable mount for the cross arm unit on the post, without the necessity of utilizing nuts and bolts or straps or any other form of connecting means. This saves considerable time and expense on erecting a trellis, or replacing existing trellis arms.

What is claimed is:

1. A trellis unit comprising a standard metal fence post of T shape in cross section having a head portion and a shank portion,
   a cross arm unit of claim 9 for said post, with said socket member being slidably fitted over an end of said post,
   The length of the shank portion of said metal post with the post considered in cross section being greater than one-half the diagonal of said passageway,
   the end edge of said shank portion engaging a corner of said passageway,
   the end edges of said head engaging inner faces which are remote from the mentioned corner.

2. A cross arm unit for supporting trellis wires and adapted to be mounted on a standard metal fence post of T shape in cross section, having a head portion and a shank portion,
   said cross arm unit including a horizontal supporting arm member of elongate form,
   said arm member having eyes at the ends thereof to receive and support trellis wires,
   said eyes each providing a wire receiving slot,
   said slots being oriented transversely to the length of said wires so that they are parallel to a plane perpendicular to the length of the trellis wires, thus requiring that portions of the wires at the eyes be flexed transversely to pass through said slots,
   an upright socket member located in transverse relation to and intermediate the length of said arm member.
   said socket member comprising a section of rectangular tubing having upper end edges and lower end edges, and providing a through passageway having inner faces for slidably fitting on the upper end of the post,
   said arm member being of rod-like form and extending across the upper edges of said socket member and traversing said passageway, and being welded to said upper edges,
   the portion of said arm member traversing said passageway serving as a stop for engaging the upper end of the post to mount said socket member on the post,
   said socket member being arranged in diagonal relation to said arm member so that said socket member is adapted to be mounted on a standard metal fence post implanted in standard fashion, to dispose the arm member crosswise to the fence line containing the post,
   one-half of the diagonal of said passageway being less than the length of the shank portion of the metal post, with the post being considered in cross section,
   a corner of such passageway to be engaged by the edge of such shank portion,
   the inner faces of said socket which are remote from the above-mentioned corner adapted for engagement by the end edges of the head of the post,
   whereby the socket is adapted to have a wobble-resistant relationship with the post.

* * * * *

UNITED STATES PATENT AND TRADEMARK OFFICE
CERTIFICATE OF CORRECTION

PATENT NO. : 4,536,989            Page 1 Of 3
DATED : August 27, 1985
INVENTOR(S) : CLAYTON DELWYN CAYWOOD & RONALD LEE BOGH It is certified that error appears in the above-identified patent and that said Letters Patent are hereby corrected as shown below:

At [56] Add:

| | | | |
|---|---|---|---|
| 66,321 | 6/1867 | Gore | 256/47 |
| 3,791,070 | 2/1974 | Roberts | 47/46 |
| 3,807,089 | 4/1974 | Senese | 47/46 |
| 4,329,811 | 5/1982 | Coulson | 47/46 |
| 4,436,284 | 3/1984 | Varela-Hernandez | 256/35 |

Column 1, line 49, change "sides" to --side--.

Column 3, line 62, change "on" to --in--.

Column 4, line 5, delete "of claim 9".

Column 4, lines 5 - 7, delete "with said socket member being slidably fitted over an end of said post" and insert "said cross arm unit including a horizontal supporting arm member of elongate form, said arm member having eyes at the ends thereof to receive and support trellis wires,

UNITED STATES PATENT AND TRADEMARK OFFICE
CERTIFICATE OF CORRECTION

PATENT NO. : 4,536,989  Page 2 of 3
DATED : August 27, 1985
INVENTOR(S) : CLAYTON DELWYN CAYWOOD & RONALD LEE BOGH It is certified that error appears in the above-identified patent and that said Letters Patent are hereby corrected as shown below:

said eyes each providing a wire receiving slot, said slots being oriented transversely to the length of said wires so that they are parallel to a plane perpendicular to the length of the trellis wires, thus requiring that portions of the wires at the eyes be flexed transversely to pass through said slots, an upright socket member located in transverse relation to and intermediate the length of said arm member, said socket member comprising a section of rectangular tubing having upper end edges and lower end edges, and providing a through passageway having inner faces slidably fitting on the upper end of said post, said arm member being of rod-like form and extending across the upper edges of said socket member and traversing said passageway and being welded to said upper edges, the portion of said arm member traversing said passageway

UNITED STATES PATENT AND TRADEMARK OFFICE
CERTIFICATE OF CORRECTION

PATENT NO. : 4,536,989            Page 3 of 3

DATED : August 27, 1985

INVENTOR(S) : CLAYTON DELWYN CAYWOOD & RONALD LEE BOGH

It is certified that error appears in the above-identified patent and that said Letters Patent is hereby corrected as shown below:

serving as a stop engaging the upper end of said post to mount said socket member on the post, said socket member being arranged in diagonal relation to said arm member so that the arm member will be disposed crosswise to a fence line containing said post, Column 4, line 8, change "The" to --the--.

Column 4, line 11, after "way" insert --of said socket member--.

Column 4, line 12, delete "end".

Column 4, line 14, after "faces" insert --of said passageway--.

Column 4, line 56, after "passageway" insert --adapted--.

Signed and Sealed this

Seventeenth Day of December 1985

[SEAL]

Attest:

DONALD J. QUIGG

Attesting Officer      Commissioner of Patents and Trademarks